United States Patent
Nyberg

(10) Patent No.: US 7,070,553 B2
(45) Date of Patent: Jul. 4, 2006

(54) METHOD AND ARRANGEMENT TO RAPIDLY LOWER THE ROTARY SPEED OF A CENTRIFUGAL SEPARATOR

(75) Inventor: Sven-Olof Nyberg, Tumba (SE)

(73) Assignee: Alfa Laval AB, Tumba (SE)

( * ) Notice: Subject to any disclaimer, the term of this patent is extended or adjusted under 35 U.S.C. 154(b) by 142 days.

(21) Appl. No.: 10/398,323

(22) PCT Filed: Oct. 15, 2001

(86) PCT No.: PCT/SE01/02244

§ 371 (c)(1),
(2), (4) Date: Sep. 9, 2003

(87) PCT Pub. No.: WO02/32581

PCT Pub. Date: Apr. 25, 2002

(65) Prior Publication Data

US 2004/0043884 A1    Mar. 4, 2004

(30) Foreign Application Priority Data

Oct. 16, 2000    (SE) .................................. 0003726

(51) Int. Cl.
*B04B 9/14* (2006.01)
*B04B 15/00* (2006.01)

(52) U.S. Cl. ............................ 494/25; 494/23; 494/37; 494/82

(58) Field of Classification Search ............. 494/1, 494/5, 6, 10, 12, 23–30, 37, 82; 210/144
See application file for complete search history.

(56) References Cited

U.S. PATENT DOCUMENTS 4,206,871 A * 6/1980 Nilsson ...................... 494/10
4,643,709 A * 2/1987 Lee et al. ................... 494/37
2004/0043884 A1* 3/2004 Nyberg ....................... 494/25
2004/0063562 A1* 4/2004 Hamatschek et al. ......... 494/82
2004/0072666 A1* 4/2004 Moss .......................... 494/37

FOREIGN PATENT DOCUMENTS

| | | | |
|---|---|---|---|
| CH | 203503 | | 6/1939 |
| DE | 2046274 | * | 9/1970 |
| DE | 1 782 647 | | 8/1971 |
| DE | 3516735 | * | 11/1986 |
| DE | 4300199 | * | 9/1994 |
| GB | 1 226 483 | | 3/1971 |
| JP | 6-343900 | * | 12/1994 |
| JP | 8-131890 | * | 5/1996 |

* cited by examiner

Primary Examiner—Charles E. Cooley
(74) Attorney, Agent, or Firm—Michaud-Duffy Group LLP

(57) ABSTRACT

In a method of rapidly lowering the rotary speed of a rotating rotor body in a centrifugal separator the lowering of the rotary speed is initiated, when a disturbing unbalance or vibrations have occurred. A space between the rotor body and a stationary casing which surrounds the rotor body is supplied with foam or with an aerosol of a liquid in a gas, when unbalance or vibrations over a certain level have occurred. The rotor body is retarded by the friction, which is obtained between the rotor body, the foam or aerosol and the casing. In an arrangement to lower the rotary speed of a rotating rotor body in a centrifugal separator the lowering is initiated when a disturbing unbalance or disturbing vibrations has occurred. At a certain unbalance or certain vibration level, a foam generating device or a device that creates an aerosol for the purpose of filling a space between the rotor body and a casing which surrounds the same with foam or aerosol is activated.

12 Claims, 3 Drawing Sheets

METHOD AND ARRANGEMENT TO RAPIDLY LOWER THE ROTARY SPEED OF A CENTRIFUGAL SEPARATOR

CROSS-REFERENCE TO RELATED APPLICATIONS

This application is entitled to the benefit of and incorporates by reference essential subject matter disclosed in International Application No. PCT/SE01/02244 filed on Oct. 15, 2001, and Swedish Patent Application No. 0003726-7 filed on Oct. 16, 2000.

FIELD OF THE INVENTION

The present invention relates to a method to rapidly lower the rotary speed of a rotating rotor body in a centrifugal separator. Lowering of the rotary speed is initiated when a disturbing unbalance or disturbing vibrations have occurred. According to the invention also an arrangement to achieve this effect is suggested.

BACKGROUND OF THE INVENTION

Centrifugal separators are usually provided with different kinds of braking devices. The braking devices may consist of a mechanical brake acting on the rotor body or on the driving shaft that sets the rotor body in motion. The rotor body may also be retarded in that the motor, which directly or indirectly makes the driving shaft rotate, is switched such that it works as a brake instead. It may take between 5 to 10 minutes to make the rotor body stop completely in a planned shutdown, since the rotating mass of the rotor body is large.

A centrifugal separator with a liquid brake is shown in DE 178 26 47. The liquid brake comprises a ring with a U-formed cross section arranged on a stationary stand. When the centrifugal separator shall be retarded the U-formed ring is filled with liquid. A braking disc, which is arranged on the rotor body, is arranged to stick into the U-formed ring. When the ring contains liquid the friction between the braking disc and the liquid creates a retarding force. In the patent specification there is also described an arrangement where the disc is stationary, while the U-ring is arranged on the rotating drum.

As a security measure centrifugal separators intended for certain applications are provided with vibration alarms, which give a signal if a disturbing unbalance or dangerous vibrations occur. When an alarm has been triggered one tries to retard the body with the braking device. If the unbalance has occurred during a complete or a partial discharge of the collected sludge from the centrifugal separator, one tries to reduce the unbalance by filling the rotor body with water and closing the flow of liquid entering the centrifugal separator. In both these cases it will be a certain time before the rotary speed is so low that the unbalance does not cause any damages.

SUMMARY OF THE INVENTION

The present invention aims at creating possibility of, in a rapid and reliable manner, lowering the rotary speed of a rotating rotor body in a centrifugal separator. This purpose is according to the invention achieved in that a space between the rotor body and a casing surrounding the same is supplied with foam or an aerosol of liquid in a gas, when unbalance or vibrations over a certain level has occurred. The rotor body is retarded by the friction, which is obtained between the rotor body, the foam or aerosol and the casing. The intention of the retardation may either be to make the rotor body stop completely or to retard it such that the rotor body rapidly passes the interval of numbers of revolutions, where disturbing vibrations or unbalance may damage the centrifugal separator. It has surprisingly been found that a supply of foam or an aerosol of liquid in gas has a considerable retarding influence. The foam consists of gas or air bubbles separated by thin liquid lamellas. The density of the foam depends on one hand on the density of the liquid, which forms the foam and on the other on the relation between the amount of liquid and gas or air. The aerosol consists of small liquid drops distributed in a gas. Also here the density depends on the density of the liquid and on the relation between the amount of liquid and gas. The retarding effect is directly proportional to the density of the medium that surrounds the rotor body.

With advantage the supply of foam or aerosol is initiated by the radial displacement of the rotor body that appears during unbalance. Alternatively the supply may be initiated by a vibration meter, which gives a signal when the vibrations exceed a certain level.

In order to avoid damages it is important that a retarding force rapidly has effect. The foam or the aerosol is therefore supplied during a short period suitably less than 30 seconds.

The amount of foam or aerosol, which must be supplied, is adapted to the size of the rotor body. For a small centrifugal separator only some liters may be needed, for a large centrifugal separator the volume may be several tens of liters.

It may be of a great advantage that the water in the foam or in the aerosol, which is vaporised by the rise in temperature due to friction, lowers the temperature of the rotor body during the retardation.

With advantage a foam is made use of which is of such a kind that it has fire extinguishing properties. In many applications inflammable liquids are treated. It may also be so that the centrifugal separator is used under conditions, where a fire may be fatal.

DETAILED DESCRIPTION OF THE PREFERRED EMBODIMENT

Figure 1:
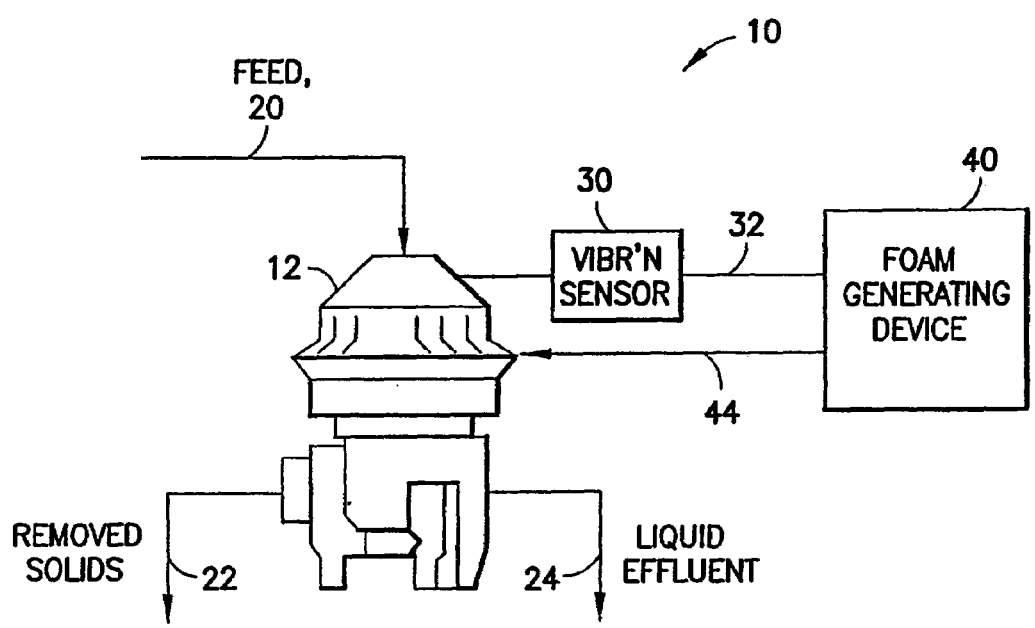
FIG. 1 is a schematic representation of an arrangement for lowering the rotary speed of a rotating body in a centrifugal separator.

Referring now to FIG. 1, an arrangement to lower the rotary speed of a rotating rotor body in a centrifugal separator is shown generally at 10. The arrangement 10 lowers the rotary speed when a disturbing unbalance or disturbing vibrations have occurred in the separator (shown at 12). The arrangement 10 comprises means arranged at a certain unbalance or at a certain level of vibrations to activate a foam generating device or a device which creates an aerosol for the purpose of filling a space between the rotor body and a casing surrounding the same with foam or aerosol.

Figure 2:
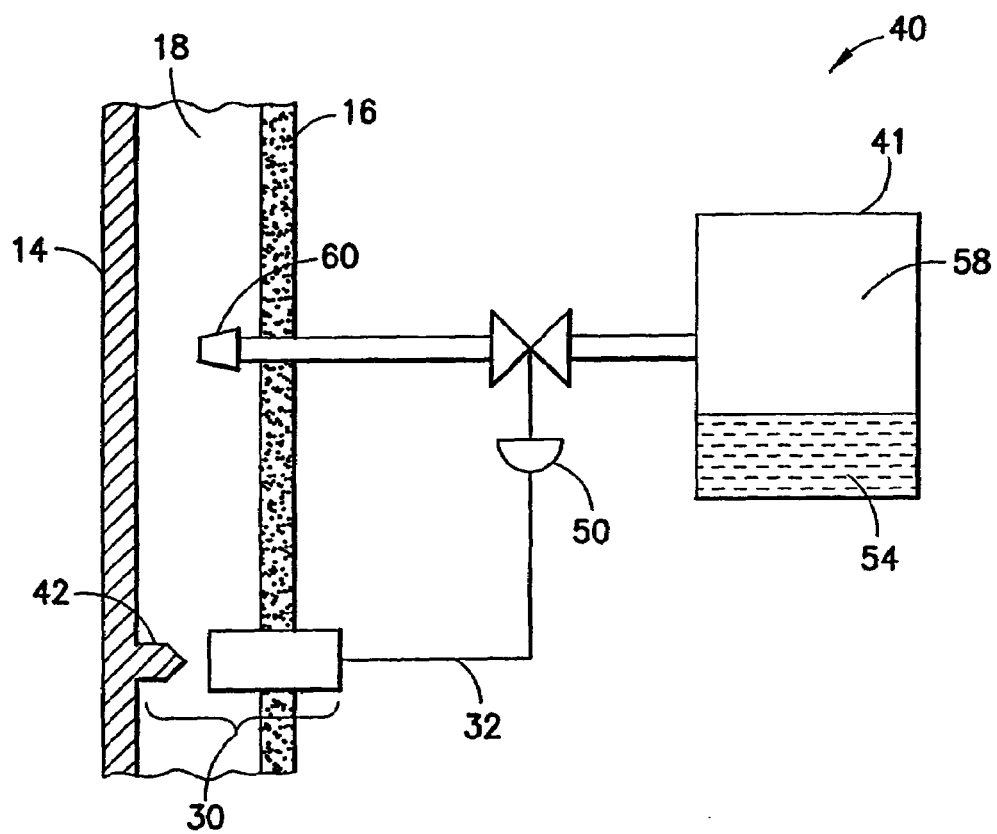
FIG. 2 is a schematic representation of a means for sensing vibration in the centrifugal separator and for activating a foam generating device.

Referring to FIGS. 1 and 2, the separator 12 comprises a rotor body 14 that rotates within a casing 16 such that a space 18 is defined therebetween. Material from which solids are to be separated is supplied to the separator 12 via a feed line 20. The solids, which are typically wet and are referred to hereinafter as "sludge," are removed from the separator 12 via a solids removal stream 22. Liquid is removed via an effluent stream 24. In one embodiment, the means to activate a foam generating device is a vibration sensor 30 located on the separator 12 so as to sense a predetermined amount of vibration. Upon sensing a predetermined amount of vibration, the vibration sensor 30 provides a mechanical actuation 32 of a foam generating device 40 which is in fluid communication with the separator 12 via a foam/aerosol line 44.

If a disturbing unbalance, which results in a radial displacement of the rotor body 14 within the casing 16, is caused by an uneven collection of sludge, said means may suitably be arranged to activate the foam generating device 40, which is connected to the space 18 between the rotor body 14 and the surrounding casing 16 as shown in FIG. 2 in order to fill the space with foam.

Said means to activate the foam generating device (e.g., the vibration sensor 30) consists with advantage of a part 42 projecting from the rotor body 14, which part at unbalance mechanically actuates a closing device 50 via the mechanical actuation 32 on the foam/aerosol line 44, which is connected to the foam generating device 40. The foam generating device 40 suitably comprises a container 41 filled with foam creating liquid 54 and gas 58.

The device, which supplies aerosol to the space 18, comprises the container 41 with water under high pressure and a nozzle 60, which when the container is opened creates a water mist with very small droplets.

According to the invention one achieves a retarding force by filling the space between the rotating rotor body and the casing with foam or with aerosol. A rotating rotor body in a centrifugal separator rotating at full speed represents a considerable amount of kinetic energy. The size of this force varies of course with the size of the rotor body. Depending on the desired time for retardation a suitable density of the foam or aerosol is chosen. Should the rotor body be retarded by supplying solely water to the space, the stress on the surrounding casing would be so large that there are risks for damages. With only air in the space the retarding force would be so small that the time from full rotation to immobility could amount to 30–90 minutes.

The retardation or the retarding moment is directly proportional to the density of the medium surrounding the rotor body.

Suitably one uses foam with a relatively large mechanical stability, which does not disintegrate directly or is thrown against the casing such that a thin air gap is formed nearest to the rotor body.

If the rotor body is retarded with an aerosol the liquid drops should be so small that the lifting forces are of the same magnitude as the force of gravity so that the drops remain in the aerosol during a certain time after the supply to the space.

A kind of foam that is suitable to use for this purpose is fire extinguishing foams. These foams are formed by surfactants, for example fluorinated surface-active substances, glycol, tensides and polysaccharides, which are mixed with water in order form a premix. In order to create the foam air or gas is supplied under pressure. Depending on the mixing relation between premix and air or gas foams with different densities are obtained. The shape of the nozzle, where the foam is created, determines the degree of expansion, i.e. the relation between liquid and gas or air in the foam. A high degree of expansion gives a lighter foam, while a larger amount of liquid gives a heavier foam.

Fire extinguishing equipment for creating water mist may also be used for creating a suitable aerosol. Such equipment comprises containers with a propellant gas of a suitable kind. The water mist is created in that the water is brought to pass special nozzles, which divide the water into very small droplets. Such a water mist comprises water droplets in the order of magnitude of 50–200 µm.

Figure 3:
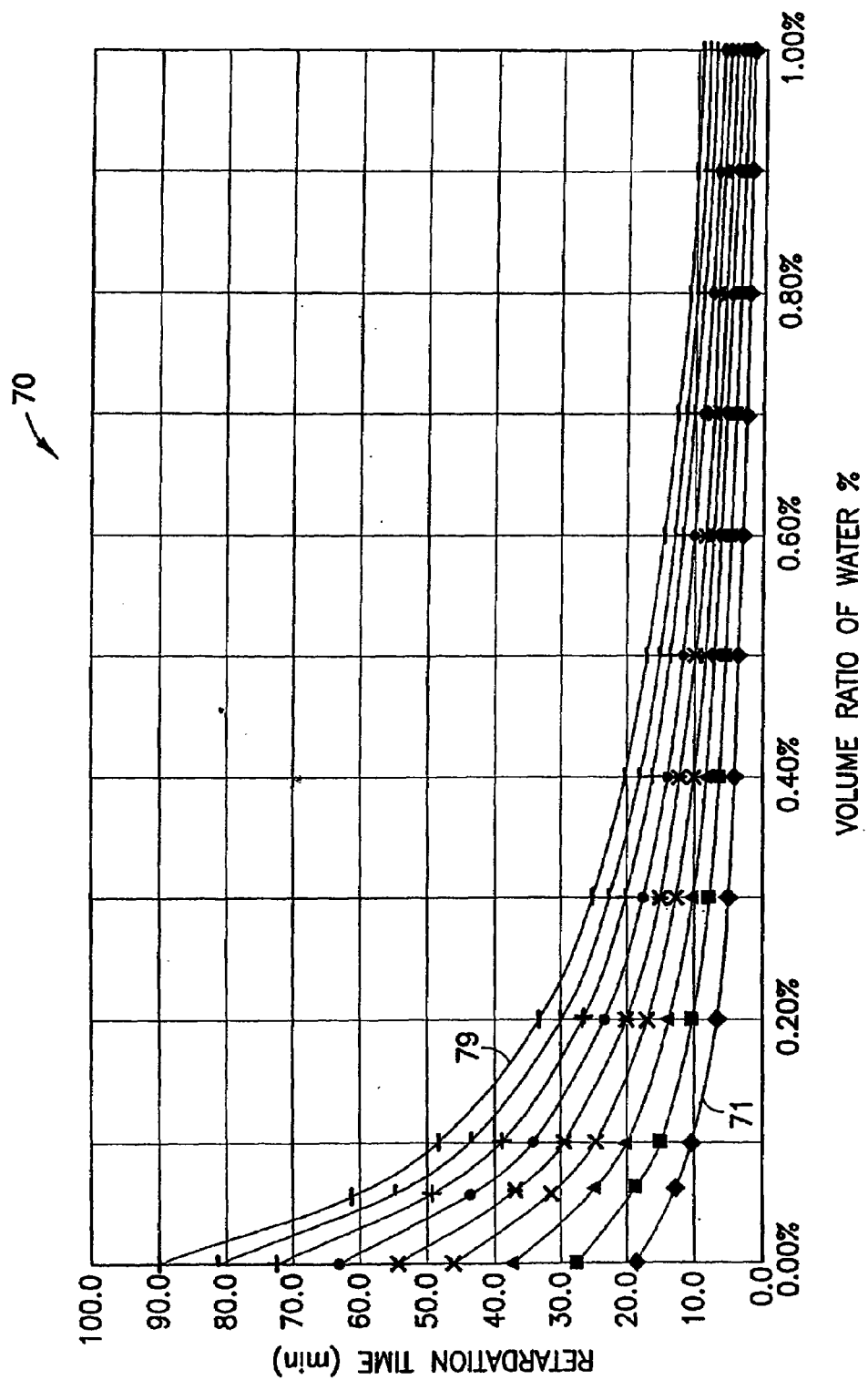
FIG. 3 is a graphical representation showing how the time to retard a rotor body depends on the size of the rotor body and on the volume ratio of water in the medium surrounding the rotor body.

Referring now to FIG. 3, the attached drawing (graph 70) shows how the time to retard a rotor body depends on the size of the rotor body and on the volume ratio of water in the medium, which surrounds the rotor body. The graph 70 at number 71 represents the rotor, which is smallest, while number 79 relates to a rotor, which is five times larger. The lines located between the lines numbered 71 and 79 represent rotors of intermediate sizes. As may be seen also a small amount of water may diminish the retarding time in a considerable degree. If the rotary speed is lowered to below 800 revolutions/min the risk for damages may be reduced considerably. In order to achieve this goal it is needed that the volume ratio of water must be in the interval 0.4% to 0.7%.

Below there is shown the result of a trial of retarding the rotor body in a centrifugal separator with foam.

In the trials an extinguishing agent was utilized which is used in foam extinguisher found on the market. The extinguishing agent was mixed with water in different proportions and the mixture was put under pressure in a pressure vessel. The pressure vessel was in its upper part provided with a pipe, which was connected to the space between the rotor body and a surrounding casing. An expansion nozzle was arranged in the part of the pipe turned towards the centrifugal separator at the inlet to the said space.

During the trials there was used a centrifugal separator with a rotor radius of 300 mm which through all the trials rotated with the same number of revolutions, 10400 rpm, when the supply of foam was started.

During the trials the number of revolutions and the retardation time was measured. The first trial was made with only a small amount of foam. The intention was to control that the rotor body was not influenced in such a manner that it turned unstable during the retardation.

The foam generating liquid is available in the form of a concentrate, which is mixed with a suitable amount of water. In trial No. 1 the amount of liquid used to produce foam was 4 liters containing 10% concentrate. The liquid was transferred to a container and was pressurized. During the trials described below the pressure in the vessel was 20 bar. When the container was opened in that the closing device was punctured the foam creation was started and went on during 20–30 seconds.

TABLE

| Trial No. | 1 | 2 | 3 | 4 | 5 |
|---|---|---|---|---|---|
| Amount liquid in lit. | 4 | 6 | 8 | 6 | 4 |
| Concentrate in % | 10 | 10 | 15 | 20 | 20 |
| Rotation speed when trial was stopped | 6000 | 0 | 0 | 0 | 20 |
| Stopping time Seconds | | — | 60 | 60 | — |

The retarding effect upon the rotor body stopped at 500 r/min in trial No. 2.

Judging from these trials 6–8 liters of liquid containing at least 10% foaming agent was needed for complete retardation of the centrifugal separator that was tested. When the centrifugal separator had come to a halt the space between the rotor body and the casing was filled with foam that could be rinsed away.

What is claimed is:

1. A method to rapidly lower the rotary speed of a rotating rotor body in a centrifugal separator, at which the lowering is initiated when a disturbing unbalance or vibrations have occurred, the method comprising the steps of supplying space between the rotor body and a stationary casing, which surrounds the rotor body, with foam or an aerosol of liquid in a gas, when unbalance or vibrations over a certain level has occurred, at which the rotor body is retarded by the friction, which is obtained between the rotor body, the foam or the aerosol and the casing.

2. A method according to claim 1, wherein the supply of foam or aerosol is initiated by the radial displacement of the rotor body caused by unbalance.

3. A method according to claim 1, wherein the supply of foam or aerosol is initiated by a vibration sensor, which gives a signal when the vibrations exceed a certain level.

4. A method according to claim 1, wherein the foam or aerosol is supplied to the space during a time period below 30 seconds.

5. A method according to claim 1, wherein the foam or aerosol is supplied in a volume which depends on the size of the rotor body.

6. A method according to claim 1, wherein the water in the foam or in the aerosol, which is vaporised lowers the temperature of the rotor body.

7. A method according to claim 1, wherein the supplied foam is of such a kind that it has fire extinguishing properties.

8. An arrangement for lowering the rotary speed of a rotating rotor body forming part of a centrifugal separator, comprising:

detection means for sensing vibration of said rotor body in response to an unbalanced condition therein;

generating means for creating at least one of a foam and an aerosol;

an actuator for activating said generating means to release at least one of said roam and said aerosol into a space defined between said rotating rotor body and a casing surrounding said rotor body, said actuator being responsive to said detection means sensing vibration levels that exceed a predetermined acceptable level; and wherein at least one of said foam and aerosol fills said space, thereby causing a reduction in the rotary speed of said rotor body.

9. An arrangement according to claim 8, wherein said actuator provides activation of said generating means at a certain vibration level depending on a radial displacement of the rotor body caused by an uneven collection of sludge.

10. An arrangement according to claim 9, wherein said actuator consists of a part projecting out from the rotor body, which at unbalance, mechanically actuates a closing device on a pipe connecting the generating means to the centrifugal separator.

11. An arrangement according to claim 10, wherein the generating means comprises a container filled with foam creating liquid.

12. An arrangement according to claim 8, wherein said generating means comprises a container with water under a high pressure and a nozzle, which, when the container has been opened, creates a water mist with very small water droplets.

* * * * *

UNITED STATES PATENT AND TRADEMARK OFFICE
CERTIFICATE OF CORRECTION

PATENT NO. : 7,070,553 B2
APPLICATION NO. : 10/398323
DATED : July 4, 2006
INVENTOR(S) : Sven-Olof Nyberg It is certified that error appears in the above-identified patent and that said Letters Patent is hereby corrected as shown below:

IN THE CLAIMS:

Claim 8
Column 6, Line 9: After "at least one of said", please delete "roam" and substitute --foam--.

Signed and Sealed this

Seventeenth Day of October, 2006

JON W. DUDAS
*Director of the United States Patent and Trademark Office*